(12) United States Patent
Desprez

(10) Patent No.: US 10,223,587 B2
(45) Date of Patent: Mar. 5, 2019

(54) PAIRING OF IMAGES OF POSTAL ARTICLES WITH DESCRIPTORS OF SINGULARITIES OF THE GRADIENT FIELD

(71) Applicant: Solystic, Bagneux (FR)

(72) Inventor: Olivier Desprez, Versailles (FR)

(73) Assignee: SOLYSTIC, Bagneux (FR)

(*) Notice: Subject to any disclaimer, the term of this patent is extended or adjusted under 35 U.S.C. 154(b) by 0 days.

(21) Appl. No.: 15/502,169

(22) PCT Filed: Jun. 15, 2016

(86) PCT No.: PCT/FR2016/051442
§ 371 (c)(1),
(2) Date: Feb. 6, 2017

(87) PCT Pub. No.: WO2016/203149
PCT Pub. Date: Dec. 22, 2016

(65) Prior Publication Data
US 2018/0089507 A1 Mar. 29, 2018

(30) Foreign Application Priority Data
Jun. 16, 2015 (FR) ...................................... 15 55465

(51) Int. Cl.
*G06K 9/00* (2006.01)
*G06K 9/46* (2006.01)
(Continued)

(52) U.S. Cl.
CPC ........ *G06K 9/00577* (2013.01); *B07C 5/3422* (2013.01); *G06K 9/325* (2013.01);
(Continued)

(58) Field of Classification Search
USPC ................................................ 382/101, 102
See application file for complete search history.

(56) References Cited

U.S. PATENT DOCUMENTS 5,142,592 A 8/1992 Moler
7,720,256 B2 * 5/2010 Desprez .................. G06K 9/46
209/559
(Continued)

FOREIGN PATENT DOCUMENTS

EP 1519796 A1 4/2005
WO 2004002638 A1 1/2004

OTHER PUBLICATIONS

French Search Report dated Apr. 5, 2016 for Application No. 1555465.
(Continued)

*Primary Examiner* — Ishrat I Sherali
(74) *Attorney, Agent, or Firm* — Patterson + Sheridan, LLP

(57) ABSTRACT

A method of processing articles, in particular postal articles, which method consists in forming a first digital image of an article and in deriving from said first image a first image signature that is a unique identifier for said article, in forming a current digital image again for said article, and in deriving from the current image a current signature that is compared with first article image signatures that are recorded in a memory, for the purpose of pairing-off the image signatures on the basis of similarity. The method is characterized in that each signature is derived using the following steps: extracting a digital map of the luminance gradient field of said image by local planar regression; identifying in said digital map points of interest corresponding to topological singularities of the gradient field having high local circular convergence or high local circular divergence.

4 Claims, 2 Drawing Sheets

(51) Int. Cl.
  *B07C 5/342* (2006.01)
  *G06K 9/32* (2006.01)
  *G06K 9/44* (2006.01)
  *G06K 9/62* (2006.01)

(52) U.S. Cl.
  CPC ............ *G06K 9/44* (2013.01); *G06K 9/4609* (2013.01); *G06K 9/4642* (2013.01); *G06K 9/4671* (2013.01); *G06K 9/6215* (2013.01); *G06K 2209/19* (2013.01)

(56) References Cited

U.S. PATENT DOCUMENTS

| | | | | |
|---|---|---|---|---|
| 8,879,785 | B1* | 11/2014 | Amacker | G06Q 10/0838 382/101 |
| 9,233,401 | B2* | 1/2016 | Miette | B07C 7/02 |
| 2009/0052780 | A1* | 2/2009 | Kwon | G06K 9/00973 382/190 |
| 2011/0054667 | A1* | 3/2011 | Caillon | B07C 3/14 700/215 |
| 2018/0137551 | A1* | 5/2018 | Zheng | G06F 17/30277 |

OTHER PUBLICATIONS

French International Search Report dated Sep. 5, 2016 for Application No. PCT/FR2016/051442.
PCT International Preliminary Report on Patentability dated May 23, 2017, for International Application No. PCT/FR2016/051442.
Bart M. ter Haar Romeny—"Chapter 6. Differential structure of images," Front-End Vision and Multi-Scale Image Analysis, 2003, Springer Science + Business Media B.V., pp. 91-136.
Martin Reuter et al.—"Laplace-Beltrami eigenvalues and topological features of eigenfunctions for statistical shape analysis," Computer-Aided Design, Elsevier Publishers BV, Barking, GB, vol. 41, No. 10, Oct. 1, 2009, pp. 739-755, XP026585080, ISSN: 0010-4485, DOI: 10.1016/J.CAD.2009.02.007.
Rui Hu et al.—"Gradient Field Descriptor for Sketch Based Retrieval and Localization," 2010 17th International Conference on Image Processing, Sep. 26-29, 2010, Hong Kong, China, IEEE, Piscataway, NJ, USA, Sep. 26, 2010, pp. 1025-1028, XP031811055, ISBN: 978-1-4244-7992-4.

* cited by examiner

PAIRING OF IMAGES OF POSTAL ARTICLES WITH DESCRIPTORS OF SINGULARITIES OF THE GRADIENT FIELD

TECHNICAL FIELD

The technical field of the invention is that of identifying articles without marking them, in particular for postal sorting.

PRIOR ART

In particular, the invention relates to a method of processing articles in which a first digital image of an article is formed and a first image signature is derived from this first image, which signature is a globally unique identifier for said article, and in which a new current digital image of said article is formed again with a current signature being derived from the current image and compared with first signatures of article images stored in memory in a data processor unit in order to pair-off the current signature by similarity with one of the first signatures.

The articles are constituted in particular by postal articles sorted automatically in a sorting machine having an automatic system for recognizing/reading destination addresses as recognized in the digital image of the postal article including said destination address, and a sorting conveyor that directs the postal article to a sorting outlet that corresponds to the automatically-recognized destination address.

A method of identifying postal articles without marking by using an image signature is already known from patent EP 1 519 796.

In that method, a digital image is formed of a postal article passing through the sorting machine and an image signature is extracted from that image, which signature is defined by two components: one component referred to as a "graphics" component that characterizes the global and local distributions of gray levels in the image; and another component referred to as a "text" component that characterizes the symbol information present in the image, and in particular the characters making up the destination address that is recognized automatically by optical character recognition (OCR).

With that known method of identifying postal articles in a sorting process comprising a plurality of passes, there is no need to apply bar code identifiers on the postal articles.

Nor is there any need to label postal articles during a first sorting pass and to re-read a bar code during subsequent sorting passes.

That results in cost reductions for performing postal sorting.

Nevertheless, the graphics component discriminates poorly when identifying postal articles that come from the same sender and that are graphically similar, so the image signature then depends on good detection of the destination address block in the image and on good recognition of the characters making up the destination address.

SUMMARY OF THE INVENTION

The object of the invention is to propose an image signature that discriminates even better in order to adapt even better to a context of pairing-off uniform images of postal articles coming from the same sender.

For this purpose, the invention provides a method of processing postal articles wherein a first digital image of an article is formed at a resolution of 2 pixels per millimeter (pixels/mm) to 10 pixels/mm and a first image signature is derived from this first image, which signature is a unique identifier for said article, and in which a current digital image for said article is formed again and a current signature is derived from the current image and compared with first signatures of article images stored in memory in a data processor unit in order to pair-off the current signature with one of the first signatures on the basis of similarity, the method being characterized in that each signature is derived from a digital image by the following steps:

extracting a digital map of the luminance gradient field of said image by local planar regression with a local matrix, e.g. of 5×5 pixels, and with or without overlap, so as to smooth surface deformations of the postal article (e.g. wrinkles of the envelopes) in the gradient field map, and so as to enhance the symbol information contained in the image, such as text characters (including those of the destination address) and high-contrast graphics;

identifying in said digital map the most robust points of interest, which are the topological singularities of the gradient field having the greatest (positive or negative) amplitude of the vector field, and which correspond to a local circular convergence extremum of the gradient field that appears in concave regions of the symbol elements in the image or to a local circular divergence extremum of the gradient field that appears at the ends of symbol elements in the image, such as alphanumeric characters of the destination address block; and representing points of interest in memory by means of digital descriptors, each of which is representative, for a certain point of interest:
a) of a spatial position of a point of interest in said image;
b) of a signed singularity index that is calculated from a combination of various physical magnitudes including a mean value of circular divergence or of circular convergence of the gradient field and of the mean amplitude of the gradient field in a pixel analysis window of the image centered on said certain point of interest; and
c) accumulating singularity indices calculated on the rings of a circular local neighborhood disk centered on said certain point of interest.

The idea on which the invention is based is thus to make the attributes of an image signature independent of the text information that has been recognized by OCR in the image by using, as signature attributes, descriptors of points of interest that relate to the topology of the luminance gradient field in the image. These image signature attributes continue to be discriminating, even within a context of images of postal articles that are graphically uniform.

An image resolution of 2 pixels/mm to 10 pixels/mm is well adapted to individualizing text characters of the destination address block, and in the method of the invention, local planar regression may be performed on image portions occupying 5×5 pixels.

This local planar regression also makes it possible to smooth surface deformations of the postal article (e.g. wrinkles of the envelope) within the gradient field image to the advantage of symbol information contained in the image such as text characters (including those of the destination address) and such as high-contrast graphics.

On this basis, the idea of the invention is to search for the most robust points of interest in the topological singularities of the symbol gradient field, and thus points of interest having high local circular convergence or high local circular divergence in the gradient field.

Since the luminance level of text symbol elements is generally less than that of the envelope background (dark characters on a pale background), the zones of local circular divergence in the gradient field appear at the ends of symbol elements such as the alphanumeric characters of the destination address block, while the zones of local circular convergence in the gradient field appear in concave regions of such symbol elements.

The size of the digital descriptor of points of interest, i.e. the number of successive rings around the points of interest under consideration over which singularity indices are accumulated, may be determined a priori on the basis of the spatial size of the zones that are to be discriminated, e.g. of the order of 15 millimeters (mm) for a destination address of a postal article. When processing digital images, it is possible to perform contraction and/or expansion on the digital descriptors of points of interest in order to mitigate variations in depths of field, which lead to variations in the resolution of images between taking the first digital image of a postal article and taking the second digital image of the same postal article.

The method of the invention may present the following features:

- in order to compare said current signature with said first signatures, said first signatures may be initially filtered in order to eliminate from the match search space those that are defined by a number of descriptions of points of interest that is very different from the number of descriptors of points of interest of the current signature; it should be observed that this filtering makes it possible to optimize pairing-off when it can be assumed that there is relative identity between the two images taken of the same article (same lighting conditions and photographing the same portions of the article). Comparison is performed by a matching measurement, i.e. by measuring a similarity distance between the descriptors of points of interest in the two signatures being compared;
- in order to compare said current signature with said first signatures, a first match searching stage is performed using a small portion of the descriptors of points of interest in the current signature in order to preselect a subset of first signatures that are compatible with the current signature, and then a second match searching stage is performed over said subset of compatible first signatures making use of all of the in descriptors of points of interest in the current signature. In this second match searching stage, use is not made of all of the points of interest but of a subset that is greater than the set used during the first match searching stage. The first searching stage serves to filter postal articles belonging to the same structural family, i.e. having in common the same graphics structures and/or text structures present in the digital images. A match occurring during the second stage of searching for matching points of interest in the images of postal articles belonging to the same structural family serves to quantify the degree of discrimination of these points of interest in a manner that is adaptive to the context of the postal articles being processed;
- the first signatures are stored in memory in an automatic postal sorting machine during a first pass of sorting postal articles, and in that the signature comparison is performed during a second pass of sorting the postal articles through the same machine or through another automatic sorting machine.

An implementation of the method of the invention is described below and shown in the drawings.

DESCRIPTION OF IMPLEMENTATIONS

Figure 1:
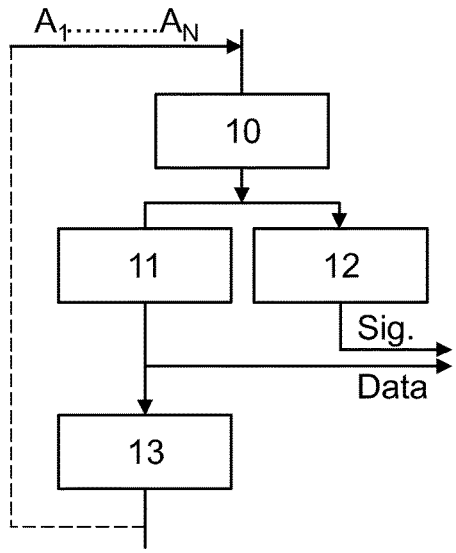
FIG. 1 is a highly diagrammatic representation of the method of extracting an image signature during a first pass of sorting postal articles.
Figure 2:
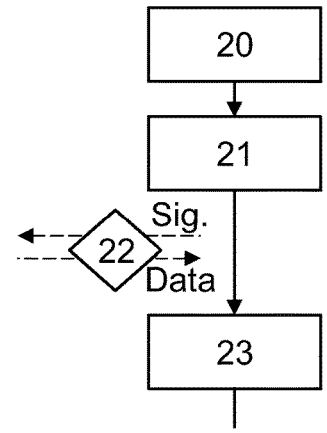
FIG. 2 is a diagram showing the method of pairing-off two image signatures in accordance with the invention during a second pass of sorting postal articles.

FIGS. 1 and 2 thus show the implementation of the method of the invention in a process for sorting postal articles in two sorting passes in a postal sorting machine 1 (shown in FIG. 6) and comprising, by way of example, an unstacker 2 feeding a sorting conveyor 3 with postal articles 4 arranged as a stack on edge at the inlet of the machine.

Figure 6:
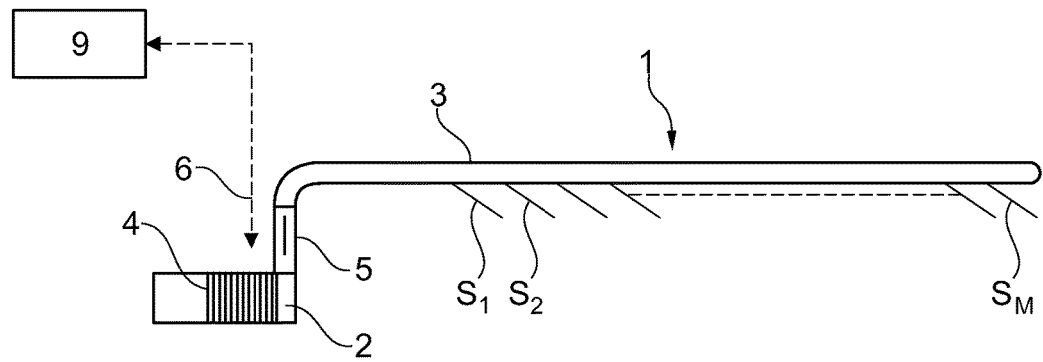
FIG. 6 shows a postal sorting machine for performing the method of the invention.

A system 5 for automatically recognizing destination addresses (as shown in FIG. 6) is arranged downstream from the unstacker 2.

Figure 7:
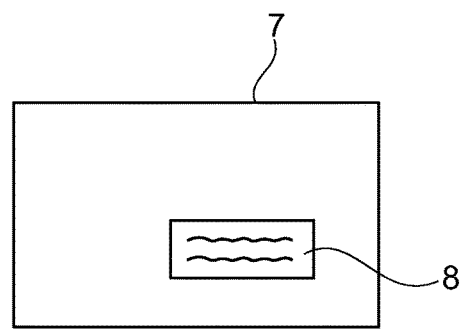
FIG. 7 shows a digital image of a postal article with a destination address block.

The recognition system comprises a camera 6 suitable in a step 10 in FIG. 1 for forming a digital image referenced 7 in FIG. 7, e.g. using multiple gray levels showing one face of one of a series of articles on edge in the machine, the image including the destination address, referenced 8 in FIG. 7, together with a data processor unit 9 that is capable of performing OCR on the image in order to recognize the address in the digital image (step 11 in FIG. 1).

The data processor unit 9 is also suitable for extracting an image signature from the digital image (step 12 in FIG. 1), which signature is referenced Sig. in FIGS. 1 and 2, which signature serves as a unique identifier for the article and is stored in a database, represented by reference 100 in FIGS. 1 and 2, in association with the recognized destination address, thereby constituting sorting data, referenced Data, for controlling the sorting conveyor 3.

On the basis of this recognized destination address, the article is sent (step 13 in FIG. 1) to a corresponding sorting outlet S1, S2, . . . , SM of the sorting conveyor, and so on for all of the articles 4 loaded at the inlet of the sorting machine.

In FIG. 2, an article is loaded into the machine for a second sorting pass.

The camera 6 forms a current digital image of the article (step 20 in FIG. 2) and a current image signature Sig. is extracted from the current image (step 21 in FIG. 2) and is compared (step 22 in FIG. 2) with first article signatures stored in the database 100 in order to detect similarity and, on the basis of this detection, in order to recover the sorting data Data for this article in order to send it (step 23 in FIG. 2) to a corresponding sorting outlet of the sorting conveyor.

Figure 3:
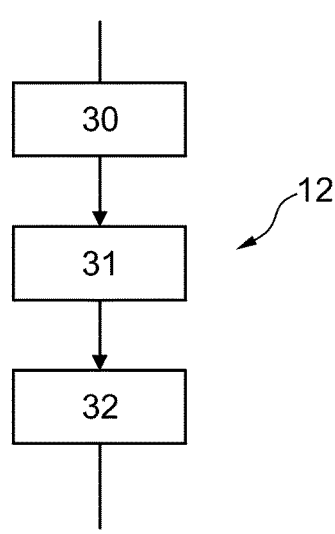
FIG. 3 shows in greater detail the method of extracting attributes from an image signature.

FIG. 3 is a highly diagrammatic illustration of the process of extracting an image signature in accordance with the invention as performed in steps 12 and 21 of FIGS. 1 and 2 respectively.

In this process, in a first processing step 30, local planar regression is applied to the digital image of the article using a local matrix, e.g. a matrix of 5×5 pixels with or without overlap, so as to obtain a digital map of the luminance gradient field.

Figure 5:
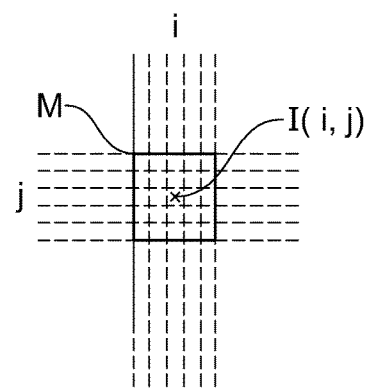
FIG. 5 shows the principle of the local planar regression used in the invention.

FIG. 5 shows the 5×5 pixel local matrix for calculating the gradient field in a digital image I, the matrix being given the reference M. This matrix M is centered on the pixel I(i,j) in the digital image of the article.

It should be observed that this 5×5 pixel analysis window is well adapted for postal articles at a resolution lying in the range 2 pixels/mm to 10 pixels/mm, since it makes it possible to incorporate the surface deformations of the article that appear in the image, such as wrinkles in a plastics envelope, reflections and shading, etc. . . . , and to enhance zones of symbol information in the image, such as printed text characters.

Thereafter, in step 31, a search is undertaken in the gradient field map resulting from step 30 for points of interest that correspond to topological singularities of the gradient field having high local circular convergence or high local circular divergence.

In particular, in step 31, the points of interest are the singularities of greatest (positive or negative) amplitude in the vector field and that correspond to a local circular convergence extremum or to a local circular divergence extremum in the gradient field.

In the invention, the points of interest retained at the outlet from step 31 are those that present a signed singularity index that is greater than an adjustable threshold (where the singularity index is the result of combining the mean circular divergence or convergence value of the gradient field and the mean amplitude of the gradient field in the 5×5 pixel analysis window). This threshold makes it possible in particular to be unaffected by interfering points of interest that are detected in the background of the image.

In this method, it can be understood that the local planar approximation coefficients provide the horizontal component and the vertical component of the vector field of the local gradient, together with its norm.

A local circular convergence or divergence extremum can be seen as an extremum of the local singularity index that corresponds to high circular convergence or divergence of the local gradient field. The signed singularity index may be seen as being the algebraic product of a local circularity index (in the range 0 to 1) multiplied by a local convergence value that may be positive or negative depending on the convergence or the divergence of the gradient field locally inside the analysis window.

More particularly, the vector field of the gradient presents singularity points that become increasingly singular with the field locally presenting high divergence/convergence, high circularity, and high amplitude. These convergence/divergence, circularity, and high amplitude indicators may each be derived by performing a convolution of the multiple gray level digital image with masks of 3×3 pixels and of 5×5 pixels. The convergence/divergence indicator may correspond to a conventional divergent mask used for determining variations in the amplitude of the symbol gradient field along two orthogonal axes. The circularity indicator may correspond to a mask used to observe a rotation of the gradient field about a central point of the mask. By way of example, the mask may be based on those used in the field of characterizing fingerprints.

Thereafter, in step 32, the unit 9 forms a digital descriptor for each point of interest in the symbol gradient field as extracted in step 31 and containing data representative of the position in spatial position of the point of interest in the digital image of the article, of its signed singularity valve, and of the configuration of its circular local neighborhood.

For a point of interest, the configuration of the circular local neighborhood in accordance with the invention consists in measuring the accumulation of signed singularity values on the rings of a neighborhood disk centered on the point of interest being described.

This descriptor is referred to below as a descriptor of gradient singularities (DOGS) and it is a signal of fixed dimension representing the spatial description radius of the singular point, e.g. 30 pixels, which corresponds to a description radius of 15 mm.

At the end of step 32, the digital image I of an article is identified in unique manner by a digital signature in the form of a set of DOGS for points of interest, each of which encodes the spatial position of a point of interest, its signed singularity value, and the signal describing singularities in a circular neighborhood.

It should be understood that the steps 30 to 32 of FIG. 3 are performed in step 21 of forming a current signature from the current image of an article presented for the second sorting pass.

Figure 4:
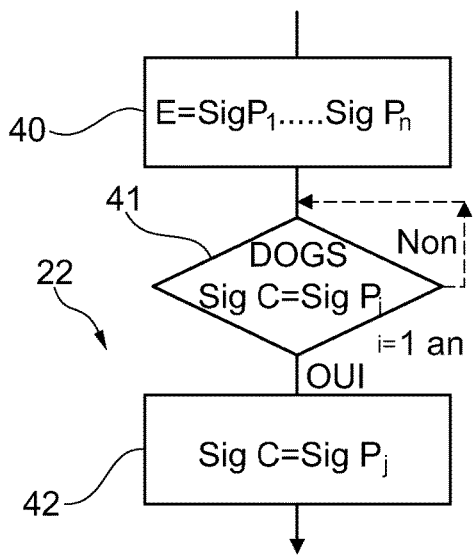
FIG. 4 shows in greater detail the method of pairing-off attributes of image signatures.

With reference to FIG. 4, there is shown in greater detail the step 22 of the method of the invention for pairing-off the DOGS of two digital signatures by means of similarities.

In FIG. 4, in step 40, depending on the completeness or otherwise of the article images being compared, it is possible to filter signatures stored in step 12 of FIG. 1 so as to reduce the search space for pairing-off one of the first signatures with the current signature.

In particular, said first signatures are filtered in order to eliminate those that have a number of points of interest DOGS that is very different from the number of point of interest DOGS for the current signature.

FIG. 4 shows a search space E containing first signatures $SigP_1$ to $SigP_n$.

Thereafter, in step 41, a search is made for the maximum similarity match between the point of interest DOGS of the current signature SigC and the point of interest DOGS of each of the first signatures $SigP_i$ of the search space.

As shown in FIG. 4, the maximum match search is performed over all of the search space E.

At the end of step 41, a first signature $SigP_j$ has been found as matching the current signature in a step 42.

On the basis of this first signature, the sorting data Data can be recovered from the database 100 shown in FIG. 2.

However, the pairing-off of DOGS can be performed over the entire search space E in two distinct stages:
  a first stage of searching for matches in which only a small number of DOGS of signatures SigC are searched for pairing-off, so as to preselect a subset of signatures belonging to the same structural family as the family of the looked-for signature SigC, i.e. in which the images contain common symbol structures; and
  a second stage of searching for matches in which a search is made to pair-off all of the DOGS within the subset of first signatures preselected during the preceding stage.

In the first stage, DOGS are paired-off using only a small portion of the DOGS. These DOGS may for example be those that present the greatest absolute singularities in the image compared with a threshold value, or indeed those that correspond to a specific zone in the image (sender address block, etc. . . . ). For each candidate signature SigC, a small number of DOGS (representative of a structural family of images, e.g. sharing the same graphics or text structure) are compared with the corresponding DOGS of each signature $SigP_j$ of the search space E in order to preselect a subset of "compatible" first signatures and in which the second stage of searching for matches is subsequently performed while making use of all of the DOGS of the current signature.

The method of the invention may be applied to postal articles that are moving while digital images are being formed or to postal articles that are stationary while digital images are being formed. Depending on circumstances, between two images being taken of the same postal article, there may be variations in luminance due to changes in the lighting of the scene or to variation in the depth of field of the camera.

It should be observed that the variations in the lighting of the scene can modify the number of points of interest detected in the images that are to be compared, but without that upsetting the process of pairing-off DOGS.

Conversely, variation in the depth of field of the camera can lead to variations of resolution in the images that can upset matching DOGS. In order to be unaffected by this variability, and without going beyond the ambit of the method of the invention, it is possible in the process of searching for a match, conditionally to scale the image signatures automatically by expanding or contracting the DOGS that are compared.

The method of the invention is tolerant to relative movements of the postal article between the two images being taken, e.g. movements in rotation or in translation, or indeed both together. This variability leads to a change in the positions of the points of interest between two passes of acquiring an image of a given article, and that can make it more complicated to match the points of interest. One method of being unaffected by this variability without going beyond the ambit of the invention may consist, when preselecting a first signature, in performing an approximation of the global rigid transformation. This approximation may be calculated by minimizing the distance between the various DOGS that are matched during the first matching phase, where the distance is minimized in the least squares sense. The parameters of the approximated transformation can thus be used during the second matching stage in order to project the spatial coordinates of each point of interest of the signature SigC looked for in the space of the digital image associated with the signature $SigP_i$ under comparison.

Furthermore, it can be understood that the DOGS make it possible to individualize digital images of postal articles that are graphically very similar by means of singularities that are independent of recognizing symbols in the destination address block of such images.

Naturally, the method of the invention may be applied to processing various kinds of article being transported on a conveyor, such as sorting parcels, and/or baggage or the like. It is suitable for operating with various image acquisition systems.

The invention claimed is:

1. A method of processing moving postal articles in a sorting machine having a data processing unit and a plurality of sorting outlets, each of the postal articles include a destination address with text symbols formed thereon, the method comprising, with respect to each of the plurality of moving postal articles:

generating a first digital image of the postal article at a resolution of 2 pixels/mm to 10 pixels/mm during a first sorting pass of the postal article in the sorting machine, the first digital image including the destination address formed on the postal article;

deriving, with the data processing unit, a first signature as a unique non marked identifier for the postal article from the first image and storing the first signature in correspondence with address information corresponding to the destination address formed on the postal article in a database;

generating a current digital image for the postal article during a second sorting pass of the article in the sorting machine, the current digital image including the destination address formed on the postal article;

deriving, with the data processing unit, a current signature from the current image;

comparing, with the data processing unit, the current signature with first signatures stored in the database and, based on the comparison, determining a pair-off with one of the first signatures on the basis of similarity; and directing, in the second sorting pass, the postal article to one sorting outlet out of the plurality of sorting outlets, the one sorting outlet being selected based on the address information stored in the database in association with the first signature determined as the pair-off, wherein the data processing unit derives each first signature and each current signature from each corresponding digital image by the following steps:

processing the digital image by local planar regression with a local matrix of 5×5 pixels, with or without overlap, to generate a digital map of a luminance gradient field in which so as to smooth surface deformations of the postal article are smoothed and symbol information contained in the image, such as text characters including those of the destination address and high-contrast graphics, are enhanced;

processing the digital map to detect, as points of interest, topological singularities of the gradient field having the greatest (positive or negative) amplitude of the gradient field, and which correspond to local circular convergence extrema of the gradient field that correspond to in concave regions of the symbol elements in the image or to local circular divergence extrema of the gradient field that appear at the ends of symbol elements in the image, such as alphanumeric characters of the destination address block; and processing the points of interest to extract digital descriptors such that the derived first signature or current signature are comprised of a set of the digital descriptors extracted with respect to the corresponding digital image, each digital descriptor containing, for one point of interest detected in the corresponding digital image:

a) data representative of a spatial position of the point of interest;

b) data representative of a signed singularity index that is calculated from a combination of various physical magnitudes including a mean value of circular divergence or of circular convergence of the gradient field and the mean amplitude of the gradient field in a pixel analysis window of the image centered on the point of interest; and c) data representative of an accumulation of singularity indices calculated on the rings of a circular local neighborhood disk centered on the point of interest.

2. The method according to claim 1, wherein in order to compare the current signature with the first signatures, the first signatures are initially filtered in order to eliminate from a search space those first signatures that are comprised of a number of digital descriptors of points of interest that is very different from a number of digital descriptors of points of interest of the current signature.

3. The method according to claim 1, wherein in order to compare the current signature with the first signatures, a first match searching stage is performed using a small portion of the digital descriptors of points of interest in the current signature in order to preselect a subset of first signatures that are compatible with the current signature, and then a second match searching stage is performed over the subset of compatible first signatures using all of the digital descriptors of points of interest in the current signature.

4. The method according to claim 1, wherein the first signatures are stored in memory in an automatic postal sorting machine during a first pass of sorting postal articles through a first area having the plurality of sorting outlets, and in that the signature comparison is performed during a second pass of sorting the postal articles through the first area or through a second area having a different plurality of sorting outlets.

* * * * *